United States Patent
Gibbons et al.

(10) Patent No.: US 9,418,699 B1
(45) Date of Patent: Aug. 16, 2016

(54) MANAGEMENT OF SEQUENTIALLY WRITTEN DATA

(71) Applicant: Western Digital Technologies, Inc., Irvine, CA (US)

(72) Inventors: Kent William Gibbons, Yorba Linda, CA (US); Chun Sei Tsai, Tustin, CA (US); Choo-Bhin Ong, Foothill Ranch, CA (US); Kenneth J. D'Souza, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/692,635

(22) Filed: Apr. 21, 2015

Related U.S. Application Data (60) Provisional application No. 62/062,083, filed on Oct. 9, 2014.

(51) Int. Cl.
  *G11B 15/18* (2006.01)
  *G06F 12/02* (2006.01)
  *G11B 20/12* (2006.01)

(52) U.S. Cl.
  CPC .... *G11B 20/1217* (2013.01); *G11B 2020/1242* (2013.01)

(58) Field of Classification Search
  None
  See application file for complete search history.

(56) References Cited

U.S. PATENT DOCUMENTS

| | | | |
|---|---|---|---|
| 6,856,556 B1 | 2/2005 | Hajeck | |
| 7,082,007 B2 | 7/2006 | Liu et al. | |
| 7,120,737 B1 * | 10/2006 | Thelin | G11B 20/1816 360/55 |
| 7,126,857 B2 | 10/2006 | Hajeck | |
| 7,340,581 B2 * | 3/2008 | Gorobets | G06F 3/0613 365/185.33 |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |

(Continued)

OTHER PUBLICATIONS

Karl L. Enarson, et al., U.S. Appl. No. 13/952,768, filed Jul. 29, 2013, 33 pages.

(Continued)

*Primary Examiner* — K. Wong (57) ABSTRACT

A Data Storage Device (DSD) includes a disk with a zone of tracks to be sequentially written. A sequential write pointer is maintained indicating a next physical location for writing data in the zone. When a write command is received to write data in a target region at a physical location behind the sequential write pointer, it is determined whether a write count for each of the target region and an adjacent region before the target region has reached a threshold number of writes. If it is determined that the write counts for both the target region and the adjacent region have not reached the threshold number of writes, the sequential write pointer for the zone is moved to the physical location and the data is written at the physical location to fulfill the write command.

21 Claims, 8 Drawing Sheets

(56) References Cited

U.S. PATENT DOCUMENTS

| | | |
|---|---|---|
| 7,974,029 B2 | 7/2011 | Tsai et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2003/0044170 A1 | 3/2003 | Haddad et al. |
| 2005/0231846 A1 | 10/2005 | Winarski et al. |
| 2007/0174582 A1 | 7/2007 | Feldman |
| 2010/0174849 A1 | 7/2010 | Walston et al. |
| 2010/0205623 A1 | 8/2010 | Molaro et al. |
| 2010/0250793 A1 | 9/2010 | Syu |
| 2011/0099323 A1 | 4/2011 | Syu |
| 2011/0197035 A1 | 8/2011 | Na et al. |
| 2011/0238887 A1 | 9/2011 | Bazzani |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

James N. Malina, et al., U.S. Appl. No. 13/662,353, filed Oct. 26, 2012, 42 pages.

Suresh, et al., "Shingled Magnetic Recording for Big Data Applications," Parallel Data Laboratory Carnegie Mellon University, 2012.

\* cited by examiner

MANAGEMENT OF SEQUENTIALLY WRITTEN DATA

CROSS REFERENCE TO RELATED APPLICATION

This application claims the benefit of U.S. Provisional Application No. 62/062,083 filed on Oct. 9, 2014, and entitled "ENHANCED DISK DRIVE TRACK MANAGEMENT IN A SHINGLED MAGNETIC RECORDING DRIVE USING A DATA REFRESH OPERATION" by Kent Gibbons et al., which is hereby incorporated by reference in its entirety.

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD).

Shingled Magnetic Recording (SMR) has recently been introduced as a way of increasing the number of Tracks Per Inch (TPI) by making the tracks narrower. SMR increases TPI by using a relatively wide shingle write head with a stronger magnetic field to overlap tracks like roof shingles. The non-overlapping portion then serves as a narrow track that can be read by a narrower read head.

Although a higher number of TPI is possible with SMR, the overlap in tracks can create a problem when writing data since new writes to a previously overlapped track affects data written in the overlapping track. For this reason, tracks are usually sequentially written to avoid affecting previously written data.

In addition, sequential writing ordinarily mitigates the effects of Adjacent Track Interference (ATI) and Wide Area Track Erasure (WATER) by reducing the number of times that a particular portion of the disk may be repeatedly written. With ATI and WATER, repeated writes to the same area on the disk can interfere with or erase data written in one or more adjacent tracks. ATI and WATER can be especially problematic for SMR due to the stronger magnetic field of the write head and closer proximity of the tracks.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
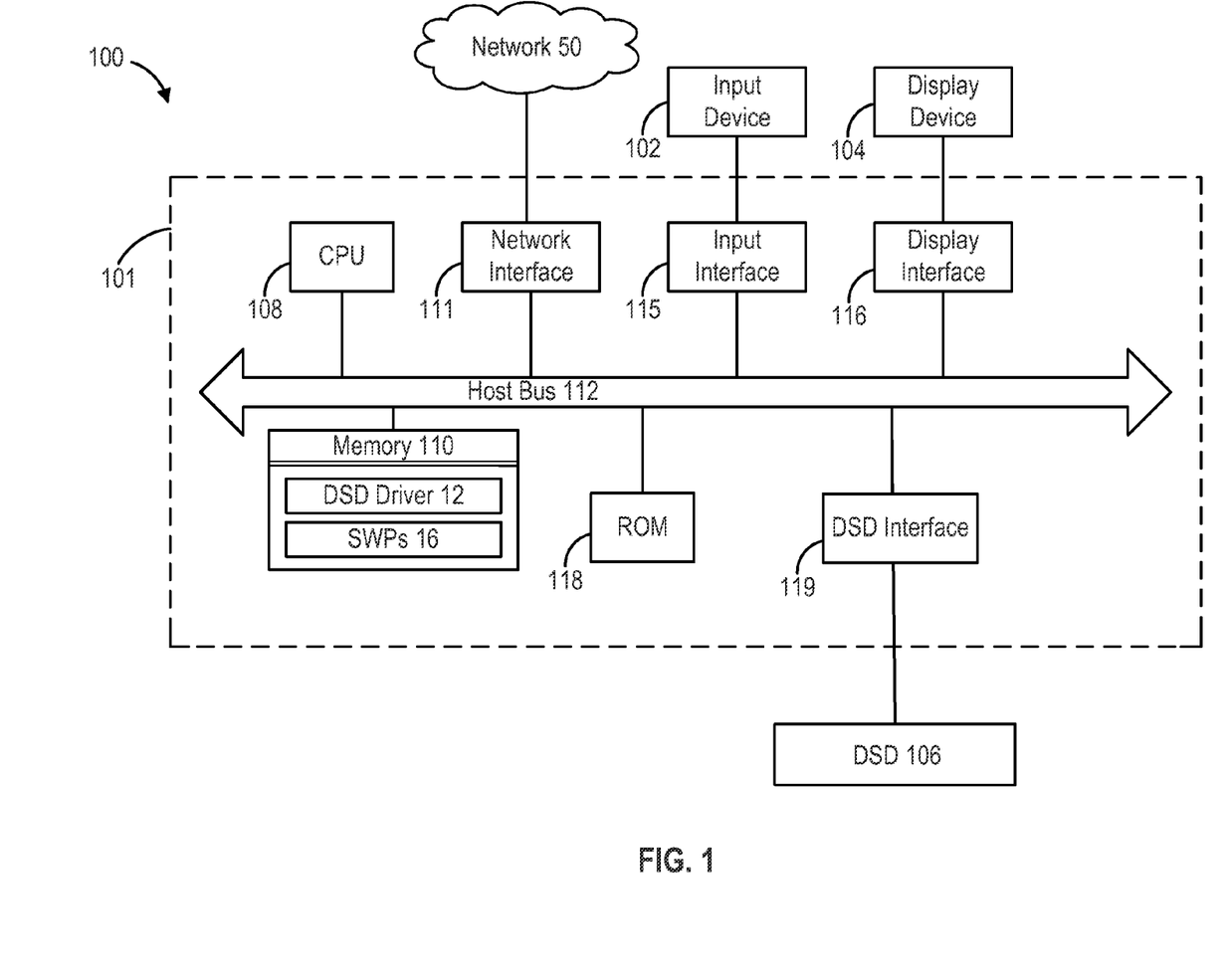
FIG. 1 is a block diagram depicting a system with a Data Storage Device (DSD) according to an embodiment.

FIG. 1 shows system 100 according to an embodiment which includes host 101, input device 102, display device 104 and Data Storage Device (DSD) 106. System 100 can be, for example, a computer system (e.g., server, desktop, mobile/laptop, tablet, smartphone, etc.) or other electronic device such as a Digital Video Recorder (DVR). In this regard, system 100 may be a stand-alone system or part of a network, such as network 50, which can, for example, be a local or wide area network, or the Internet.

Those of ordinary skill in the art will appreciate that system 100 can include more or less than those elements shown in FIG. 1 and that the disclosed processes can be implemented in other environments Input device 102 can be a keyboard, scroll wheel, or pointing device allowing a user of system 100 to enter information and commands to system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. A processor of host 101 as referenced hereinafter can be one or more of the foregoing processors or another processor configured to perform functions described herein. CPU 108 interfaces with host bus 112. Also interfacing with host bus 112 are memory 110, which may include such as various types of volatile or non-volatile Random Access Memory (RAM), input interface 115 for input device 102, display interface 116 for display device 104, Read Only Memory (ROM) 118, network interface 111, and data storage interface 119 for DSD 106.

Memory 110 represents a volatile memory of host 101 that interfaces with host bus 112 to provide information stored in memory 110 to CPU 108 during execution of instructions in software programs such as DSD driver 12. More specifically, CPU 108 first loads computer-executable instructions from DSD 106 into a region of memory 110. CPU 108 can then execute the stored process instructions from memory 110. Data such as Sequential Write Pointers (SWPs) 16 or data to be stored in or retrieved from DSD 106 can also be stored in memory 110 so that the data can be accessed by CPU 108 during execution of software programs to the extent that such software programs have a need to access and/or modify the data.

As shown in FIG. 1, memory 110 can be configured to store DSD driver 12 and write pointers 16. DSD driver 12 provides a software interface for DSD 106 on host 101, and can cause CPU 108 to perform some of the processes discussed below.

Figure 2:
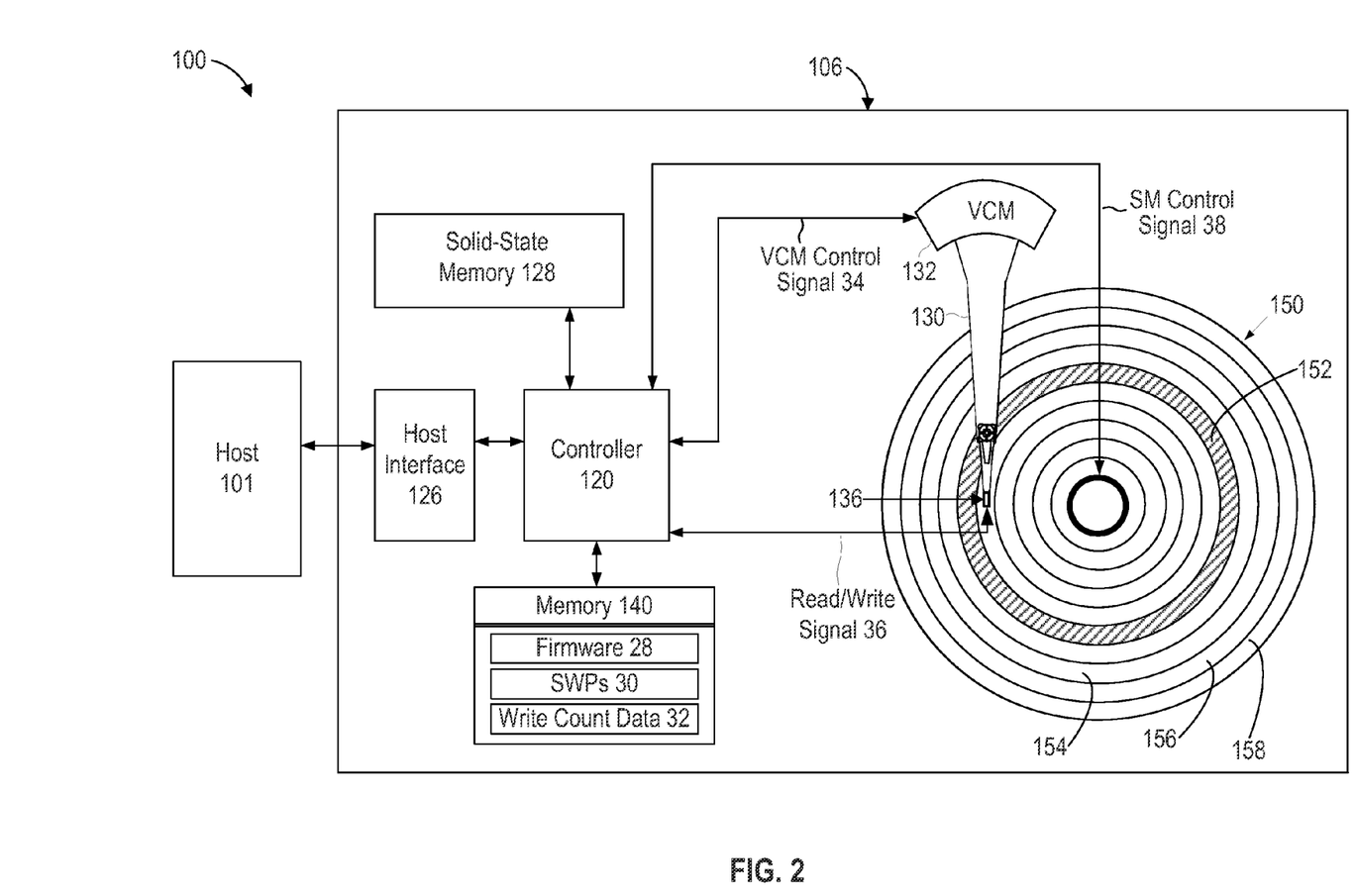
FIG. 2 is a block diagram depicting the DSD of FIG. 1 according to an embodiment.

SWPs 16 can indicate locations for performing a next write in sequentially written zones on a disk of DSD 106 (e.g., disk 150 shown in FIG. 2). The SWPs can include a logical address associated with a particular sector in a track in the zone. DSD driver 12 may update SWPs 16 as data is written on a disk of DSD 106 based on notifications or updates received from DSD 106. As discussed in more detail below, SWPs can be used to implement sequential writing in one or more zones on a disk.

Data storage interface 119 is configured to interface host 101 with DSD 106, and can interface according to a standard such as, for example, Serial Advanced Technology Attachment (SATA), PCI express (PCIe), Small Computer System Interface (SCSI), or Serial Attached SCSI (SAS).

FIG. 2 depicts a block diagram of DSD 106 according to an embodiment where DSD 106 includes Non-Volatile Memory (NVM) in the form of rotating magnetic disk 150 and solid-state memory 128. In other embodiments, DSD 106 may not include solid-state memory 128 or may include a different type of NVM in addition to rotating magnetic disks. In addition, each of solid-state memory 128 and/or disk 150 may be replaced by multiple Solid-State Drives (SSDs) or Hard Disk Drives (HDDs) in other embodiments.

DSD 106 includes controller 120 which includes circuitry such as one or more processors for executing instructions and can include a microcontroller, a DSP, an ASIC, an FPGA, hard-wired logic, analog circuitry and/or a combination thereof. In one implementation, controller 120 can include a system on a chip (SoC).

Host interface 126 is configured to interface DSD 106 with host 101 and may interface according to a standard such as, for example, SATA, PCIe, SCSI, or SAS. As will be appreciated by those of ordinary skill in the art, host interface 126 can be included as part of controller 120. Although FIG. 2 depicts the co-location of host 101 and DSD 106, in other embodiments the two need not be physically co-located. In such embodiments, DSD 106 may be located remotely from host 101 and connected to host 101 via a network interface.

In the example of FIG. 2, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks (not shown) on disk 150. As will be appreciated by those of ordinary skill in the art, some embodiments may include one or more additional disks circumferentially aligned below disk 150 to form a disk pack with corresponding heads 136 arranged in a Head Stack Assembly (HSA) to read and write data on corresponding disk surfaces of the disk pack.

The tracks on disk 150 are grouped into zones of tracks such as zones 154, 156, and 158. In the embodiment of FIG. 2, zones 154, 156, and 158 include overlapping tracks written using Shingled Magnetic Recording (SMR). As discussed above, SMR can increase the amount of data stored in a given area on disk 150 by overlapping tracks like roof shingles. The non-overlapping portion then serves as a narrow track that can be read by head 136. Disk 150 may include multiple zones of overlapping tracks or a combination of zones with overlapping and non-overlapping tracks. In other embodiments, disk 150 may include a single zone of overlapping or non-overlapping tracks.

Although a higher number of Tracks Per Inch (TPI) is possible with SMR, the overlap in tracks can create a problem when writing data since new writes to a previously overlapped track affects data written in the overlapping track. For this reason, tracks in SMR zones 154, 156, and 158 are generally sequentially written to avoid affecting previously written data.

In addition, sequential writing in SMR zones can ordinarily mitigate the effects of Adjacent Track Interference (ATI) and Wide Area Track Erasure (WATER) by reducing the number of times that these zones are written. With ATI and WATER, repeated writes to the same area on disk 150 can interfere with or erase data written in one or more adjacent tracks. Disk 150 may also include a number of gap tracks or empty tracks between zones in order to protect against the effects of writes in an adjacent zone.

In the example of FIG. 2, disk 150 includes spare area 152 for storing data otherwise intended for storage in other locations on disk 150. Spare area 152 can include an overprovisioned area or a zone of non-overlapping tracks written using Conventional Magnetic Recording (CMR) so that data can be written to spare area 152 more frequently before the data in spare area 152 becomes vulnerable to ATI and WATER. In other embodiments, spare area 152 may be omitted in favor of storing data in solid-state memory 128.

DSD 106 also includes solid-state memory 128 for storing data across power cycles. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 2, DSD 106 includes memory 140, which can include, for example, a Dynamic Random Access Memory (DRAM). Memory 140 can be used by DSD 106 to temporarily store data. Data stored in memory 140 can include data read from NVM such as disk 150 or solid-state memory 128, data to be stored in NVM, instructions loaded from firmware 28 for execution by controller 120, and/or data used in executing firmware 28. In this regard, firmware 28 can include computer executable instructions for controlling operation of DSD 106.

In the example of FIG. 2, memory 140 is also used to store SWPs 30 and write count data 32. Similar to SWPs 16 discussed above with reference to FIG. 1, SWPs 30 are used by controller 120 to indicate locations for performing a next write in sequentially written zones on disk 150 (e.g., zones 154, 156, and 158). SWPs 16 can include, for example, a logical address associated with a particular sector in a track in the zone.

Write count data 32 can be used by controller 120 to keep track of a number of times data has been written in different zones or regions of disk 150. Once a write count for a particular zone or region within a zone has reached a threshold number of writes for the zone, a refresh operation can be performed to help protect against the deterioration of data in the zone due to ATI or WATER. In a refresh operation, valid or non-obsolete data stored in the zone is rewritten to protect the data. In addition, more recent versions of data intended to be stored in the zone that are stored elsewhere (e.g., "dirty data" stored in solid-state memory 128) can be written in the zone as part of the refresh operation. The refresh operation may be performed as a background activity of DSD 106.

In operation, host interface 126 receives host read and write commands from host 101 via host interface 126 for reading data from and writing data to NVM. In response to a write command from host 101, controller 120 may buffer the data to be written for the write commands in memory 140.

For data to be written on disk 150, a read/write channel (not shown) of controller 120 may encode the buffered data into write signal 36 which is provided to head 136 for magnetically writing data on disk 150. In addition, controller 120 via a servo system (not shown) can provide VCM control signal 30 to VCM 132 to position head 136 over a particular track for writing the data.

In response to a read command for data stored on disk 150, controller 120 via a servo system positions head 136 over a particular track. Controller 120 controls head 136 to magnetically read data stored in the track and to send the read data as read signal 36. A read/write channel of controller 120 can then decode and buffer the data into memory 140 for transmission to host 101 via host interface 126.

For data to be stored in solid-state memory 128, controller 120 receives data from host interface 126 and may buffer the data in memory 140. In one implementation, the data is then encoded into charge values for charging cells (not shown) of solid-state memory 128 to store the data.

In response to a read command for data stored in solid-state memory 128, controller 120 in one implementation reads current values for cells in solid-state memory 128 and decodes the current values into data that can be transferred to host 101 via host interface 126.

Example Sequential Write Processes

Figure 3A:
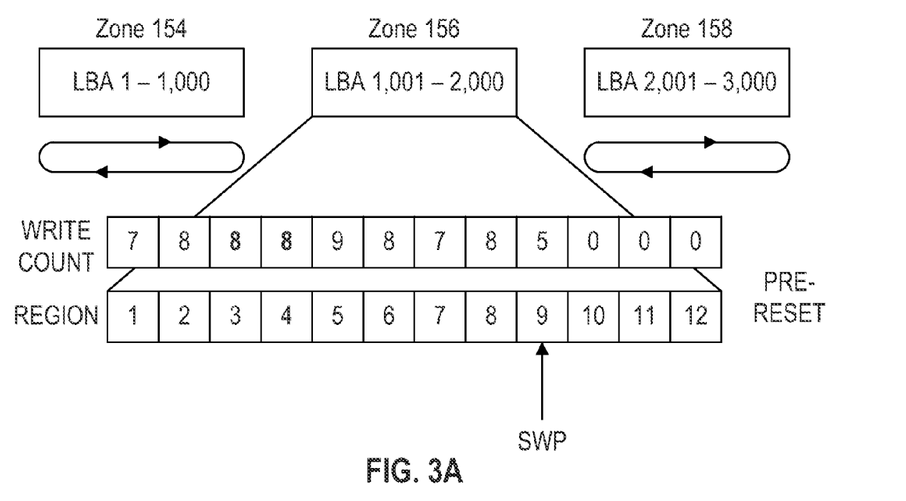
FIG. 3A illustrates a Sequential Write Pointer (SWP) before being moved backwards to within a target region according to an embodiment.

As noted above, a sequentially written zone (e.g., SMR zones 154, 156, and 158) can use a SWP of SWPs 30 to keep track of a location for performing a next write in the sequentially written zone. In the example of FIG. 3A, zones 154, 156, and 158 are sequentially written zones in that each zone is written in order from a beginning physical location in the zone toward an ending physical location in the zone. After reaching the ending physical location, new writes to the zone can begin at the beginning location and continue in order toward the ending physical location to overwrite the data previously written in the zone. This is represented by the circular arrows shown below the boxes representing zones 158 and 154 in FIG. 3A. The SWP is typically reset to the beginning location of a zone to allow for the complete overwrite of data in the zone.

In addition, the physical locations within the zones (e.g., sectors on disk 150) can be associated with a logical address (e.g., Logical Block Address (LBA)) that follows a sequential addressing from the beginning location to the ending location of the zone. This is reflected in FIG. 3A with LBA ranges of 1 to 1,000 for zone 158, 1,001 to 2,000 for zone 156, and 2,001 to 3,000 for zone 154.

In practice, a strict adherence to sequential writing can limit the use of sequential zones such as SMR zones 154, 156, and 158. Although sequential writing may be well suited for applications such as a data archive where data is typically sequentially written, sequential writing is generally not well suited to applications where data is written in a more random order. The present disclosure therefore seeks to provide a middle ground where sequential writing is still generally performed while allowing a greater flexibility to handle out-of-order writes by moving or resetting a SWP to a previous location in the zone, not just to the beginning location of the zone as is the prior convention. Since the prior convention would require any change to a zone to be effected by a complete re-write of the zone, the several embodiments described herein enable rewrite of a selected portion of the zone, significantly reducing the amount of data that needs to be rewritten if any changes within the zone are required.

To facilitate such a more flexible backward movement of the SWP, one or more embodiments of the present disclosure considers different regions of the zone in determining whether moving the SWP back to that region would exceed a threshold number of writes for the region that is used to protect against the deterioration of data (e.g., data deterioration caused by ATI or WATER). In one implementation, each region in the zone can correspond to a particular number of tracks in the zone. The size of each region can also be based on a particular condition such as the number of tracks that are usually affected by ATI, such as four tracks. As the effects of ATI, WATER and other such deterioration effects are dependent on the recording head size and other head characteristics, track density and/or media characteristics, other implementations may use a different number of tracks as the size for regions.

In addition, to support the determination of whether an SWP can be safely reset to a certain region, one embodiment associates the aforementioned write counts for the individual regions, and increments those counts as data is written into the regions. In one embodiment, each write may trigger different write count updates to different regions. For example, a write into a region A may significantly increase the write counts of the region A and regions close to A (to account for ATI) and slightly increase the write counts of regions located farther away from region A (to account for WATER).

Figure 3B:
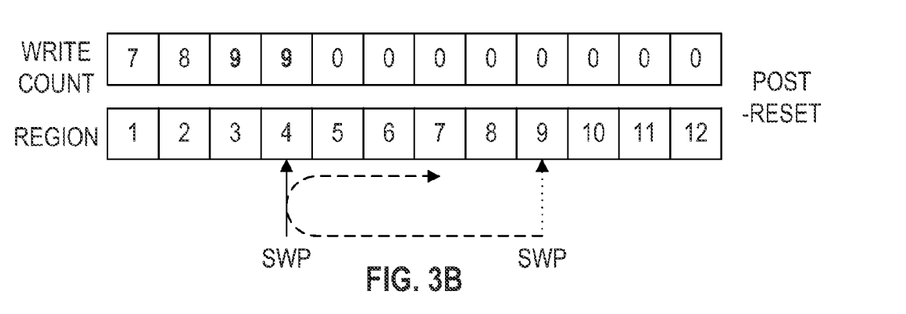
FIG. 3B illustrates the SWP of FIG. 3A after being moved backwards to within the target region according to an embodiment.

The examples of FIGS. 3A to 3G conceptually illustrate a resetting or movement of a SWP back to a previous location in zone 156. FIGS. 3A and 3B illustrate the backwards movement of a SWP to within a target region according to an embodiment. As shown in FIG. 3A and FIG. 3B, the SWP for zone 156 starts near the middle of region 9 in FIG. 3A and in FIG. 3B is reset or moved back to near a middle location of a target region 4 in zone 156. The movement of the SWP back to region 4 can be, for example, to modify data that was previously written in region 4. After data is written in target region 4, the writing of data in zone 156 can continue sequentially from the new position toward the end of zone 156, and write counts are accordingly updated for the affected regions by each write thereafter.

As shown in FIG. 3B, the act of resetting the SWP to region 4 effectively renders data in the downstream regions (regions 5-12) obsolete, so the write counts for those regions are reset to zero (as shown) in one embodiment since any deterioration of such data is no longer of concern. Those reset write counts will be incremented later as new valid data are written into those regions. Data in the part of region 4 after the new SWP location is also rendered obsolete, however, because there is still valid data before the SWP in region 4, the write count of region 4 is not reset but instead incremented from the prior write count number of 8 to 9, to account for the new write occurring there. Region 3, being adjacent to region 4, also has its write count incremented.

Note that, for the sake of illustration, in this example the write count is simply incremented by one, and only the adjacent region is considered. In practice, in some embodiments, the write count for each region may be incremented differently, according to the region size (resolution of tracking) relative to the size of the write head. For example, a small region size would mean that more regions would be affected by a write and would need their counts incremented and checked at reset time. Also, write counts of regions may be raised by different increments according to their distance from the write. For example, regions farther from the write may have their write counts incremented by a smaller amount to account for the WATER effect while regions closer to the write may have their write counts incremented by a larger amount to account for the ATI effect.

Besides the write count tracking, in one embodiment, before moving the SWP back to a target region, a write count for the target region (region 4 in FIG. 3A) and one or more adjacent region (e.g., region 3 in FIG. 3A) are checked to see if any write counts have reached a threshold number of writes used to protect the data from deterioration caused by, for example, ATI or WATER. This check is to ensure data safety and to provide the maximum freedom of reset flexibility, whether the reset is performed by the host or the data storage device. Without such a check, data in one or both regions may be at risk of deterioration from repeated resets of the SWP to one or both regions (or nearby regions). The check ensures that each reset and any subsequent writes to the reset can be safely performed without putting data at a risk of deterioration beyond an acceptable threshold.

In the example of FIG. 3A, the write count of adjacent region 3 (8) and target region 4 (8) were both below the threshold of 10, so the reset was allowed to occur since even after the increment they would be below the threshold. On the other hand, the reset would be disallowed if any region's write count exceeds the threshold. The reason region 3 is also checked is that although no new writes are made in adjacent region 3, a write in target region 4 can have the effect of causing the deterioration of data in adjacent region 3 due to a direction of a magnetic field in writing data in target region 4. In an SMR implementation, the direction of the magnetic field can correspond to the direction of overlap in writing SMR tracks. Note that, in one embodiment, the region(s) downstream from the SWP (e.g. region 5) is/are not checked since all such regions will be rewritten and their write counts will be reset accordingly.

Figure 3C:
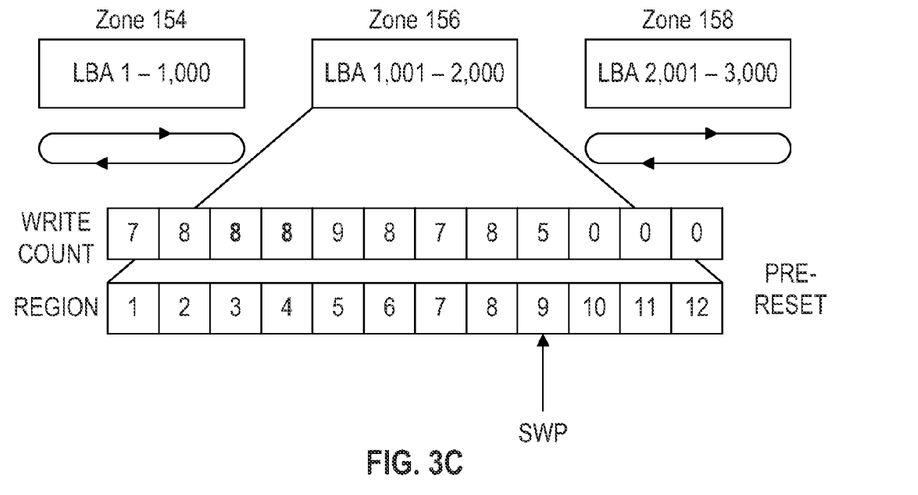
FIG. 3C illustrates a SWP before being moved backwards to the beginning of a target region according to an embodiment.
Figure 3D:
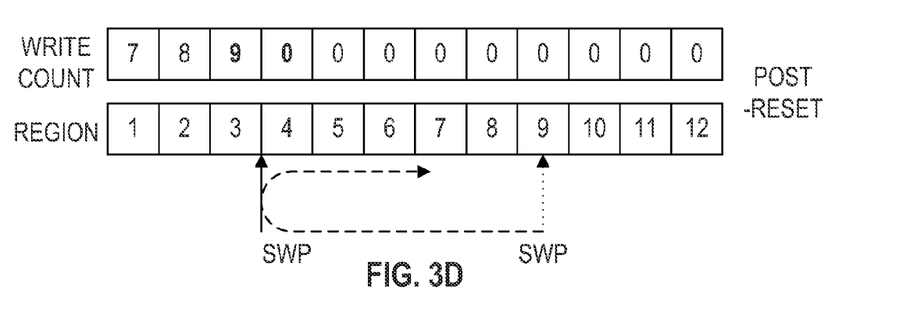
FIG. 3D illustrates the SWP of FIG. 3C after being moved backwards to the beginning of the target region according to an embodiment.

FIGS. 3C and 3D illustrate a backwards movement of the SWP to a beginning location of a target region according to an embodiment, similar to that shown in FIGS. 3A and 3B. As shown in FIG. 3D, the SWP for zone 156 is moved back or reset to a beginning location of a target region in zone 156 (region 4 as shown). Data can then be written sequentially from the beginning location of the target region (region 4) toward the ending location of zone 156 (i.e., toward region 12) until the SWP for zone 156 is again moved back to a previous region. The difference in FIGS. 3C and 3D is that the write count for region 4 has also been reset to zero, since the SWP is reset to the beginning of region 4 and all previously written data in the region is rendered obsolete as a result. As shown by the examples of FIGS. 3B and 3D, the SWP can be moved back to any location within the target region, and the write counts may be reset accordingly.

Figure 3E:
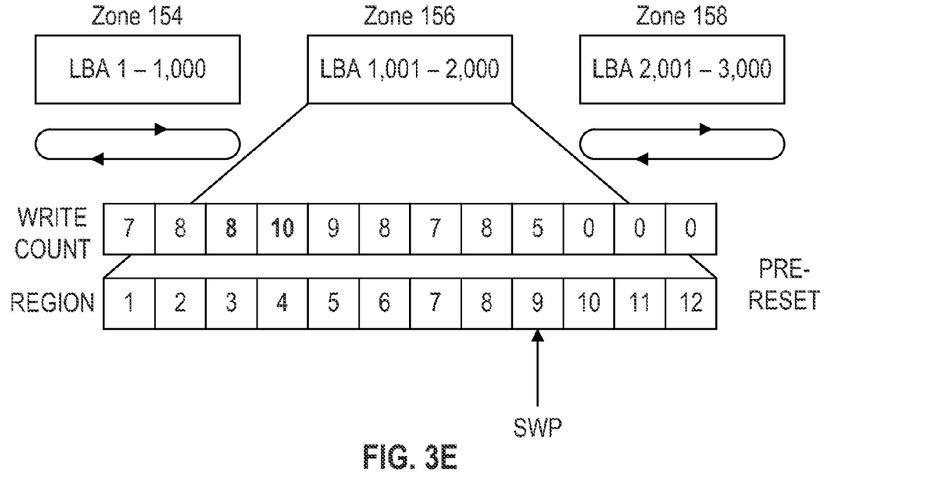
FIG. 3E illustrates a SWP before being moved backwards to a previous region according to an embodiment.
Figure 3F:
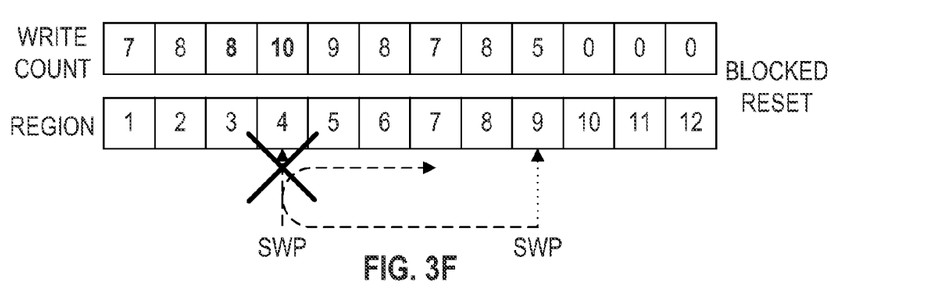
FIG. 3F illustrates the blocking of a backwards movement of the SWP of FIG. 3E to a target region according to an embodiment.
Figure 3G:
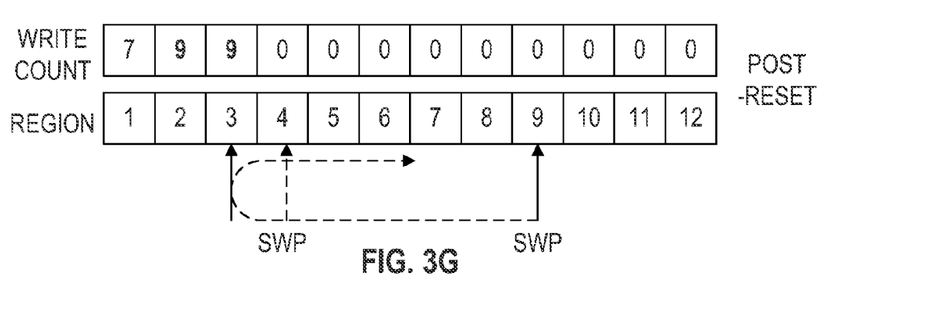
FIG. 3G illustrates the SWP of FIG. 3E after being moved backwards to a previous region according to an embodiment.

FIGS. 3E to 3G illustrate a backwards movement of the SWP to a previous region before a target region according to an embodiment. In the example of FIG. 3E, the write count for target region 4 has reached the threshold number of writes. Thus the reset is blocked in FIG. 3F, and various measures described in this disclosure can be taken (e.g., inform the host, divert to another write location). Note that the same blocking mechanism would be triggered if region 3's count also reaches the threshold. In one embodiment, the counts indicate that reset to those regions are not possible, until (1) a data refresh operation for the entire zone is performed, causing the entire zone's write counts to reset or (2) a SWP is reset to a region upstream has occurred to cause the data to be rendered obsolete and the write counts to reset. In an alternative embodiment, the threshold comparison is made after accounting the write to be performed if reset is allowed to occur.

FIG. 3G shows that according to one embodiment the SWP can be moved back to a previous region such as region 3 if the write counts for region 3 and its adjacent region 2 have not reached the threshold number of writes. If the write counts for one or both of region 3 or 2 have reached the threshold number of writes, in one implementation, the SWP can then be moved back to region 1 if it has not reached the threshold number of writes. In the case of FIG. 3G, a suitable reset point was found in region 3 and the reset was allowed to occur and the write counts are updated accordingly. After the SWP is moved back to a previous region, the writing in zone 156 continues sequentially toward the end of zone 156, unless the SWP is moved back again.

In another embodiment, the SWP may instead be moved to a region ahead of the target region but still behind the current position of the SWP if a reset to the target region is not allowed to occur. For example, if the write count for the target region 4 or its adjacent region 3 has reached the threshold number of writes, the SWP may instead be moved back to a region ahead of the target region such as region 6 in FIG. 3G if regions 6 and 5 have not reached the threshold number of writes.

In one embodiment, the first region upstream where reset is allowed is reported to the host or otherwise made available for the host to obtain. The host can either query this information ahead of time or be informed when a reset is blocked. This information may provide the host with an allowable location to which the SWP can be reset.

Figure 4A:
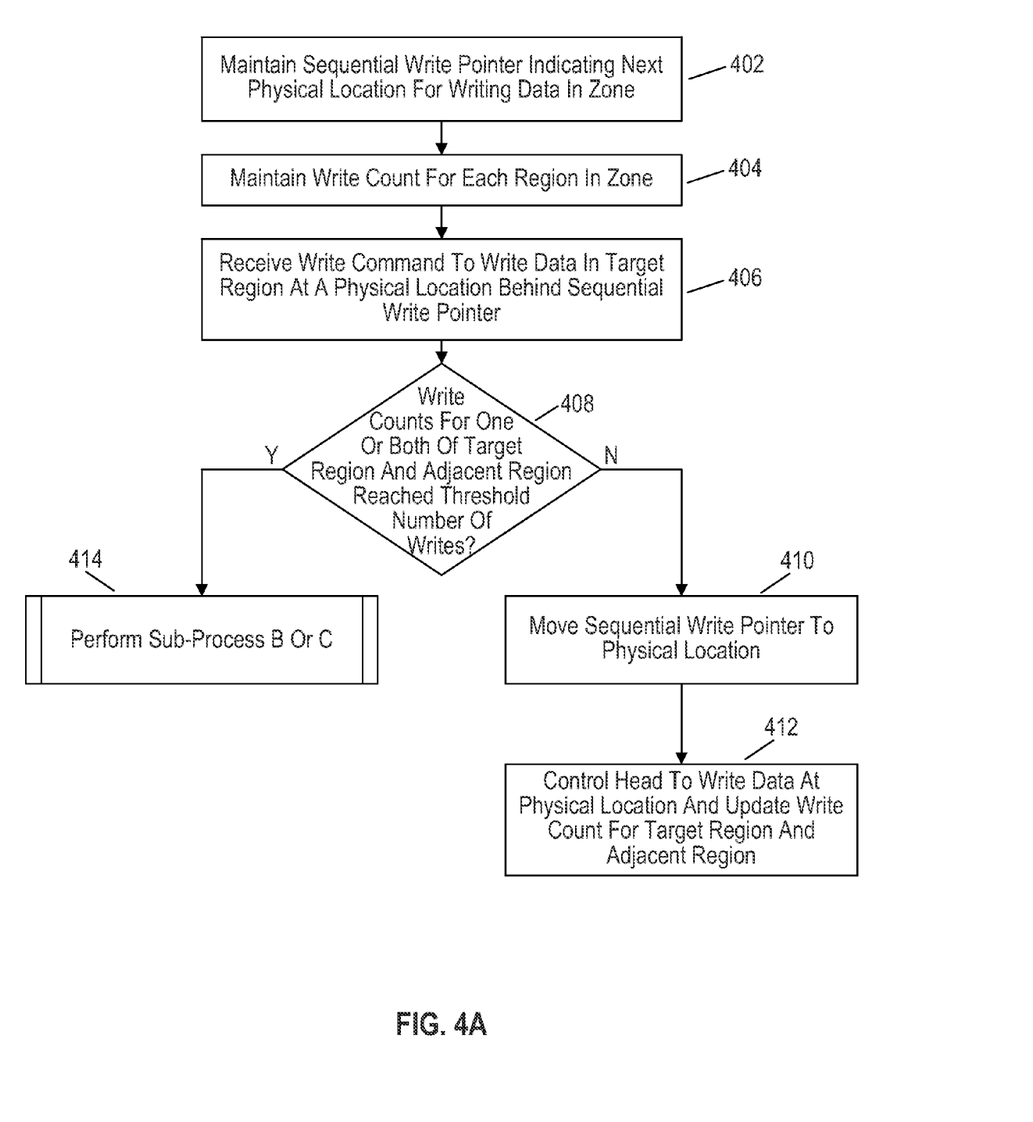
FIG. 4A is a flowchart for a sequential write process according to an embodiment.

FIG. 4A is a flowchart for a sequential write process that can be performed by controller 120 executing firmware 28 according to an embodiment. In block 402, controller 120 maintains a SWP indicating a next physical location for writing data in a sequentially written zone such as one of SMR zones 154, 156, or 158. In maintaining a SWP for a zone, controller 120 updates the position of the SWP after a write is performed in the zone. The SWP can be maintained as part of SWPs 30 in memory 140.

In block 404, controller 120 maintains a write count for each region in the zone. As discussed above, the write count can correspond to a number of times data has been written in a particular region. Controller 120 can maintain the write counts for the different regions of the zone in write count data 32.

In block 406, controller 120 receives a write command from host 101 via host interface 126 to write data in a target region at a physical location behind the SWP for the zone. In one implementation, the write command can indicate the physical location with a logical address (e.g., LBA) associated with the data to be written. The write command can be, for example, to modify data that was previously written in the physical location indicated by the write command.

In block 408, controller 120 determines whether the write counts for one or both of the target region and an adjacent region have reached a threshold number of writes. The threshold number of writes can be set based on a number of writes that can be performed in the target region without affecting data in the adjacent region such as from ATI or WATER. In some implementations, the threshold number of writes can be dynamically set by controller 120 based on considerations including environmental conditions such as temperature. For example, controller 120 may lower the threshold number of writes when a temperature of DSD 106 exceeds a threshold temperature.

In addition, controller 120 may calibrate the threshold number of writes for a particular region, zone, or head based on past performance. For example, controller 120 may lower the threshold number of writes for regions in a zone that have experienced a greater amount of variance of the head from the center of tracks in the zone (i.e., a higher Track Mis-Registration (TMR)). In such an example, the greater distance from the center of tracks can worsen the effects of ATI or WATER in nearby tracks and can therefore warrant a lower threshold number of writes.

In block 410, controller 120 moves the SWP to the physical location indicated by the write command received in block 406. This can include updating the position indicated by the SWP in SWPs 30 in memory 140. In block 412, controller 120 controls head 136 to write data for the write command at the physical location. The write counts for the target region and the adjacent region are also updated in write count data 32 to reflect the write in the target region. As discussed above, in some implementations, a write in the target region can also affect data in an adjacent region so the write count for the adjacent region is also updated.

On the other hand, if it is determined in block 408 that one or both of the write counts for the target region and the adjacent region have reached the threshold number of writes, the process proceeds to block 414 to perform a sub-process. In one implementation, sub-process B of FIG. 4B may be performed. In another implementation, sub-process C of FIG. 4C may be performed.

Figure 4B:
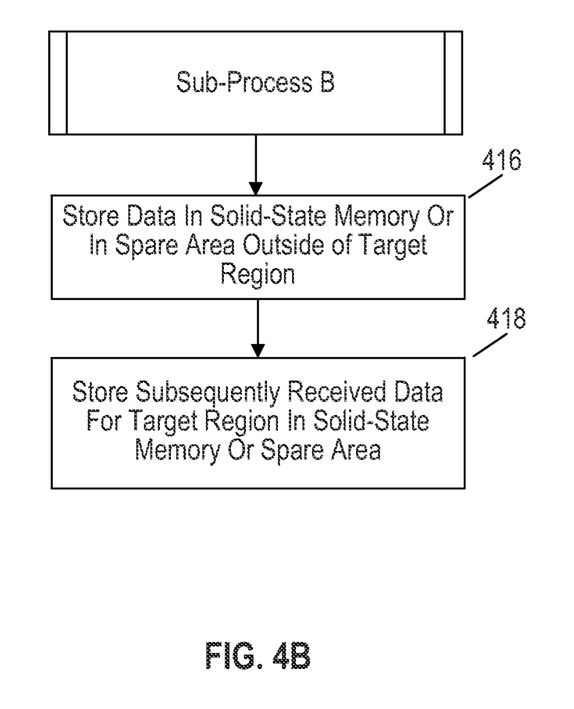
FIG. 4B is a flowchart for an example sub-process of the sequential write process of FIG. 4A according to an embodiment.

As shown in sub-process B of FIG. 4B, controller 120 in block 416 can store the data for the write command received in block 406 of FIG. 4A in solid-state memory 128 or in a spare area outside of the target region, such as spare area 152 on disk 150, which can serve as a media based cache. In block 418, subsequently received data to be stored in the target region can be stored in solid-state memory 128 or in a spare area on disk 150. In some implementations, the data from the write command that is stored in solid-state memory 128 or the spare area can be migrated back to the zone after a refresh operation is performed for the zone or the SWP for the zone is otherwise moved behind the physical location indicated by the write command. For example, using the example in FIG. 3B, a reset to region 4 may not be possible and a write to region 4 may be diverted to solid-state memory or spare area instead. The diverted write may be migrated back to region 4 at a later time when a later reset to region 3 has occurred.

Figure 4C:
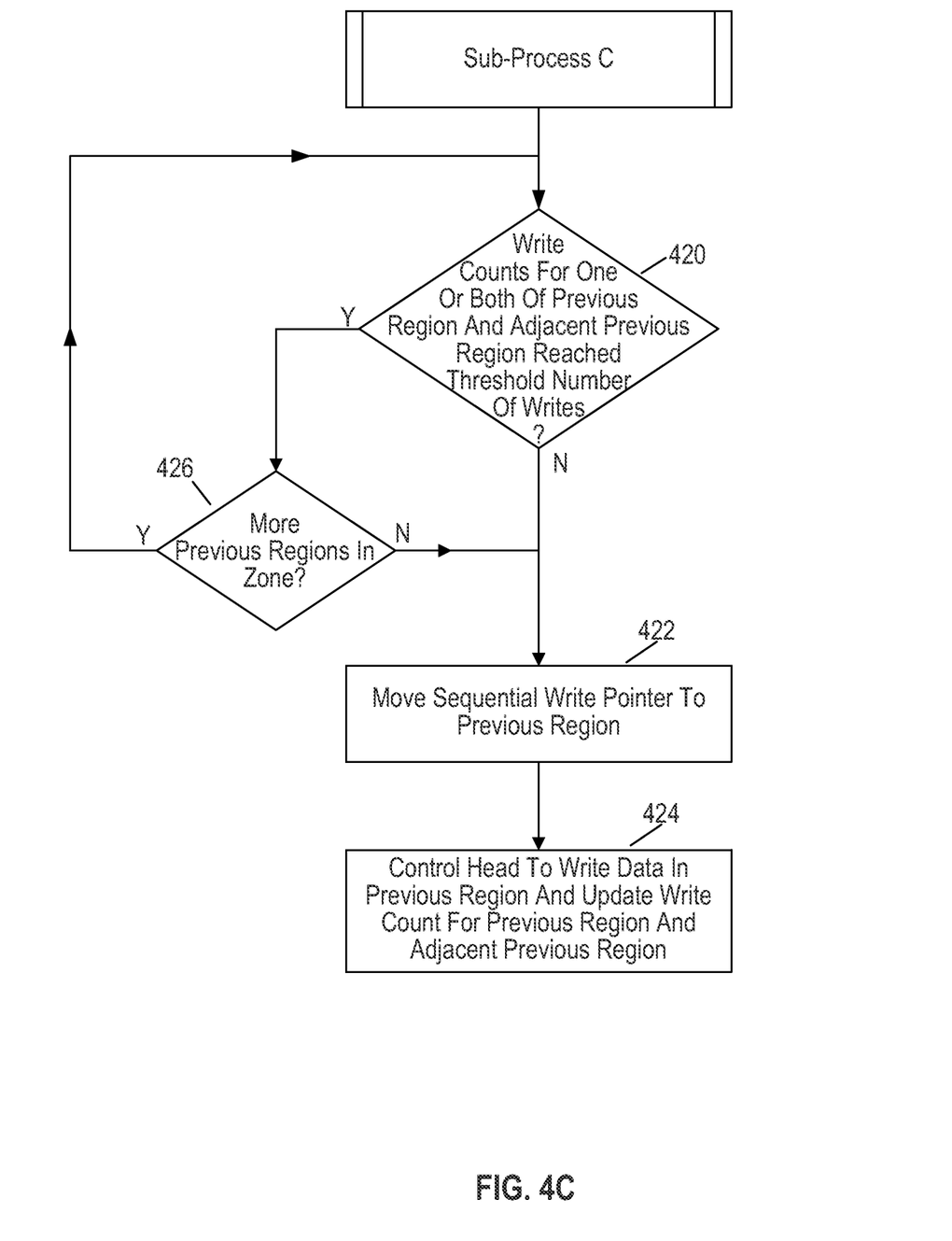
FIG. 4C is a flowchart for a different example sub-process of the sequential write process of FIG. 4A according to an embodiment.

FIG. 4C provides a different sub-process where one or more previous regions and their respective adjacent regions are checked to see if the data from the write command can be written in a previous region before the target region. In block 420, controller 120 determines whether the write counts for one or both of a previous region and an adjacent previous region (e.g., previous region 3 and adjacent previous region 2 in the example of FIG. 3C) have reached the threshold number of writes. The previous region may be the region immediately before the target region (i.e., the adjacent region to the target region) or the previous region may be further behind the target region.

If the write counts for the previous region and the previous adjacent region have not reached the threshold number of writes, the SWP for the zone is moved back to the previous region in block 422 and head 136 is controlled in block 424 to write the data from the write command in the previous region. The write counts for the previous region and the adjacent previous region are also updated in block 424 to reflect the write in the previous region.

If it is determined in block 420 that one or both of the write counts for the previous region and the adjacent previous region have reached the threshold number of writes, controller 120 in block 426 checks whether there are more previous regions in the zone. If so, the process returns to block 420 to check the write counts for the next previous region and its adjacent region.

If there are no more previous regions in the zone, then the current region is the first region for the zone (e.g., region 1 in the example shown in FIG. 3C). The process then proceeds to blocks 422 and 424 to move the SWP back to the first region and write the data for the write command in the first region.

In other embodiments, controller 120 may only check a certain number of previous regions before either performing sub-process B of FIG. 4B or performing a refresh operation for the zone. However, by checking previous regions, it is ordinarily possible to accommodate an out of order write without having to rewrite from the beginning of the zone. Moreover, resources of DSD 106 can be conserved while still handling an out of order write in an otherwise sequentially written zone.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   a disk including a zone of tracks to be sequentially written, the zone including at least one physical region for storing data on the disk;
   a head for reading data from and writing data on the disk; and
   a controller configured to:
      maintain a sequential write pointer indicating a next physical location for writing data in the zone;
      receive a write command to write data in a target region at a physical location that is behind the sequential write pointer for the zone;
      determine whether a write count for each of the target region and an adjacent region before the target region has reached a threshold number of writes, the write count corresponding to a number of writes that have been previously performed in the respective region; and
      if it is determined that the write counts for both the target region and the adjacent region have not reached the threshold number of writes:
         move the sequential write pointer for the zone to the physical location; and
         control the head to write the data at the physical location to fulfill the write command.

2. The DSD of claim 1, wherein if it is determined that the write counts for one or both of the target region and the adjacent region have reached the threshold number of writes, the controller is further configured to:
   determine whether a write count for a previous region before the sequential write pointer other than the target region has reached the threshold number of writes;
   determine whether a write count for an adjacent previous region has reached the threshold number of writes, wherein the adjacent previous region is before the previous region; and
   if it is determined that the write counts for both the previous region and the adjacent previous region have not reached the threshold number of writes:
      move the sequential write pointer for the zone to the previous region; and
      control the head to write the data in the previous region to fulfill the write command.

3. The DSD of claim 1, wherein the physical location is a beginning location of the target region.

4. The DSD of claim 1, wherein the physical location is after a beginning location of the target region.

5. The DSD of claim 1, wherein the write command is to modify previously written data in the target region.

6. The DSD of claim 1, wherein the target region includes a plurality of overlapping tracks.

7. The DSD of claim 1, wherein if it is determined that the write count for either the target region or the adjacent region has reached the threshold number of writes, the controller is further configured to store the data for the write command in a solid-state memory of the DSD or in a spare area of the disk outside of the target region.

8. The DSD of claim 7, wherein the controller is further configured to write the data for the write command at the physical location after the data for the write command has been stored in the solid-state memory or the spare area if the sequential write pointer is moved to a location before the physical location.

9. The DSD of claim 1, wherein the threshold number of writes is set based on a number of writes that can be performed in the target region without affecting data in the adjacent region.

10. The DSD of claim 1, wherein the controller is further configured to, if the threshold number of writes for the target region has been reached, temporarily store subsequently received data for the target region in a solid-state memory of the DSD or in a spare area of the disk outside of the target region.

11. A method for operating a Data Storage Device (DSD) including a disk with a zone of tracks to be sequentially written, wherein the zone includes at least one physical region for storing data, the method comprising:
   maintaining a sequential write pointer indicating a next physical location for writing data in the zone;
   receiving a write command to write data in a target region at a physical location behind the sequential write pointer for the zone;
   determining whether a write count for each of the target region and an adjacent region before the target region has reached a threshold number of writes, the write count corresponding to a number of writes that have been previously performed in the respective region; and
   if it is determined that the write counts for both the target region and the adjacent region have not reached the threshold number of writes:
      moving the sequential write pointer for the zone to the physical location; and
      writing the data at the physical location to fulfill the write command.

12. The method of claim 11, wherein if it is determined that the write counts for one or both of the target region or the adjacent region have reached the threshold number of writes, the method further comprises:

determining whether a write count for a previous region before the sequential write pointer other than the target region has reached the threshold number of writes;

determining whether a write count for an adjacent previous region has reached the threshold number of writes, wherein the adjacent previous region is before the previous region; and if it is determined that the write counts for both the previous region and the adjacent previous region have not reached the threshold number of writes:

moving the sequential write pointer for the zone to the previous region; and writing the data in the previous region to fulfill the write command.

13. The method of claim 11, wherein the physical location is a beginning location of the target region.

14. The method of claim 11, wherein the physical location is after a beginning location of the target region.

15. The method of claim 11, wherein the write command is to modify previously written data in the target region.

16. The method of claim 11, wherein the target region includes a plurality of overlapping tracks.

17. The method of claim 11, wherein if it is determined that the write count for either the target region or the adjacent region has reached the threshold number of writes, the method further comprises storing the data for the write command in a solid-state memory of the DSD or in a spare area of the disk outside of the target region.

18. The method of claim 17, further comprising writing the data for the write command at the physical location after the data for the write command has been stored in the solid-state memory or the spare area if the sequential write pointer is moved to a location before the physical location.

19. The method of claim 11, wherein the threshold number of writes is set based on a number of writes that can be performed in the target region without affecting data in the adjacent region.

20. The method of claim 11, wherein if the threshold number of writes for the target region or the adjacent region has been reached, the method further comprises temporarily storing subsequently received data for the target region or the adjacent region in a solid-state memory of the DSD or in a spare area of the disk outside of the target region.

21. A non-transitory computer readable medium storing computer executable instructions for operating a Data Storage Device (DSD) including a disk with a zone of tracks to be sequentially written and at least one physical region in the zone for storing data, wherein when the computer executable instructions are executed by a controller of the DSD, the computer executable instructions cause the controller to:

maintain a sequential write pointer indicating a next physical location for writing data in the zone;

receive a write command to write data in a target region at a physical location behind the sequential write pointer for the zone;

determine whether a write count for each of the target region and an adjacent region before the target region has reached a threshold number of writes, the write count corresponding to a number of writes that have been previously performed in the respective region; and if it is determined that the write counts for both the target region and the adjacent region have not reached the threshold number of writes:

move the sequential write pointer for the zone to the physical location; and write the data at the physical location to fulfill the write command.

* * * * *